US012786609B2

(12) United States Patent
Zhao

(10) Patent No.: US 12,786,609 B2
(45) Date of Patent: Nov. 3, 2026

(54) HEAD-MOUNTED DEVICE, AND FAR-FIELD MUFFLING METHOD, APPARATUS AND SYSTEM THEREFOR

(71) Applicant: Goertek Inc., Weifang (CN)

(72) Inventor: Zhongxu Zhao, Shandong (CN)

(73) Assignee: Goertek Inc., Weifang (CN)

( * ) Notice: Subject to any disclaimer, the term of this patent is extended or adjusted under 35 U.S.C. 154(b) by 210 days.

(21) Appl. No.: 18/714,778

(22) PCT Filed: Sep. 20, 2022

(86) PCT No.: PCT/CN2022/119791
§ 371 (c)(1),
(2) Date: May 30, 2024

(87) PCT Pub. No.: WO2023/098237
PCT Pub. Date: Jun. 8, 2023

(65) Prior Publication Data
US 2024/0388833 A1 Nov. 21, 2024

(30) Foreign Application Priority Data
Nov. 30, 2021 (CN) ......................... 202111447208.4

(51) Int. Cl.
*H04R 1/10* (2026.01)
*G06F 3/01* (2006.01)
(Continued)

(52) U.S. Cl.
CPC ......... *H04R 1/1041* (2013.01); *H04R 1/1008* (2013.01); *H04R 1/1075* (2013.01);
(Continued)

(58) Field of Classification Search
CPC .. H04R 1/1041; H04R 1/1008; H04R 1/1075; H04R 29/00; H04R 2430/01; H04R 3/02;
(Continued)

(56) References Cited

U.S. PATENT DOCUMENTS 9,843,861 B1 * 12/2017 Termeulen .......... G10L 21/0208
10,555,106 B1 * 2/2020 Mehra ..................... G06F 3/165
(Continued)

FOREIGN PATENT DOCUMENTS

CN 110972029 A 4/2020
CN 114143640 A 3/2022
(Continued)

*Primary Examiner* — Carolyn R Edwards
*Assistant Examiner* — Kuassi A Ganmavo
(74) *Attorney, Agent, or Firm* — Baker Botts LLP

(57) ABSTRACT

The present disclosure provide a far-field muffling method for a head-mounted device, apparatus and system, which is applied to the head-mounted device. The head-mounted device comprises a first speaker, a second speaker, and further comprises a monitoring microphone. The method comprises: receiving a monitoring sound signal picked up by the monitoring microphone during operations of the first speaker and the second speaker; judging whether the monitoring sound signal satisfies a preset requirement, and if yes, ending; if not, determining a current first target compensation signal and a current second target compensation signal from preset various compensation signals; compensating the first speaker by using the first target compensation signal, compensating the second speaker by using the second target compensation signal, and returning to the receiving a monitoring sound signal picked up by the monitoring microphone.

10 Claims, 2 Drawing Sheets

(51) Int. Cl.

| | |
|---|---|
| ***G10K 11/178*** | (2006.01) |
| ***H04R 1/34*** | (2006.01) |
| ***H04R 3/02*** | (2006.01) |
| ***H04R 29/00*** | (2006.01) |

(52) U.S. Cl.
CPC ............ *H04R 29/001* (2013.01); *G06F 3/011* (2013.01); *G06F 3/012* (2013.01); *G10K 11/17813* (2018.01); *G10K 11/17854* (2018.01); *H04R 1/34* (2013.01); *H04R 3/02* (2013.01); *H04R 29/002* (2013.01); *H04R 2430/01* (2013.01); *Y02D 30/70* (2020.08)

(58) Field of Classification Search
CPC ...... H04R 1/34; H04R 19/001; H04R 29/002; Y02D 30/70; G10K 11/17854; G10K 11/17813; G06F 3/012; G06F 3/011
See application file for complete search history.

(56) References Cited

U.S. PATENT DOCUMENTS

| | | | | |
|---|---|---|---|---|
| 10,699,691 | B1 | 6/2020 | Ye et al. | |
| 10,893,357 | B1 * | 1/2021 | Oishi | H04R 1/345 |
| 10,904,669 | B1 | 1/2021 | Talakoub et al. | |
| 11,074,903 | B1 * | 7/2021 | Yen | G10K 11/17881 |
| 11,284,191 | B1 * | 3/2022 | Miller | H04R 1/403 |
| 2014/0141724 | A1 * | 5/2014 | Liu | H04R 1/1083<br>455/63.1 |
| 2014/0314256 | A1 * | 10/2014 | Fincham | H04R 3/12<br>381/303 |
| 2018/0292539 | A1 * | 10/2018 | Chang | G01S 19/215 |
| 2019/0253545 | A1 * | 8/2019 | Yu | H03G 1/02 |

FOREIGN PATENT DOCUMENTS

| | | | | |
|---|---|---|---|---|
| EP | 0464222 B1 | * | 11/1995 | H04R 3/04 |
| FR | 2954655 A1 | * | 6/2011 | H04S 7/307 |

* cited by examiner

HEAD-MOUNTED DEVICE, AND FAR-FIELD MUFFLING METHOD, APPARATUS AND SYSTEM THEREFOR

CROSS-REFERENCE TO RELATED APPLICATIONS

The present disclosure is a National Stage of International Application No. PCT/CN2022/119791, filed on Sep. 20, 2022, which claims priority to a Chinese patent application No. 202111447208.4 filed with the CNIPA on Nov. 30, 2021 and entitled "HEAD-MOUNTED DEVICE, AND FAR-FIELD MUFFLING METHOD, APPARATUS AND SYSTEM THEREFOR", both of which are hereby incorporated by reference in their entireties.

TECHNICAL FIELD

The present disclosure relates to the field of head-mounted device, and particularly to a head-mounted device and a far-field muffling method, apparatus and system.

BACKGROUND

Currently, more and more VR or AR products on the market are focusing on far-field muffling performance. In other words, reducing sound leakage through the design of a structure and Digital Signal Process (DSP), thereby protecting privacy of a user. Wherein, the dual-speaker solution has gradually become the technology development trend due to the good symmetry of the structural design and the convenience for switching the muffling mode. However, although there is desirable symmetry in the theoretical design, due to impacts such as the design tolerances, assembly errors of structural parts, etc., they will still cause the frequency response and phase difference between the two loudspeakers to some extent, which will have a certain impact on the muffling performance and affect the user's experience.

In view of the above, how to provide a head-mounted device and a far-field muffling method, apparatus and system for solving the above technical problem has become a problem that needs to be solved by those skilled in the art.

SUMMARY

An objective of embodiments of the present disclosure is to provide a head-mounted device, and a far-field muffling method, apparatus and system, which is beneficial in improving the far-field muffling effect during use, thereby enhancing the user's experience.

To solve the above technical problem, the present disclosure provides a far-field muffling method for a head-mounted device, the method applied to the head-mounted device, the head-mounted device comprising a first speaker, a second speaker, and characterized by further comprising a monitoring microphone, the method comprises:

- receiving a monitoring sound signal picked up by the monitoring microphone during operations of the first speaker and the second speaker;
- judging whether the monitoring sound signal satisfies a preset requirement, and if yes, ending: if not, determining a current first target compensation signal and a current second target compensation signal from preset various compensation signals; and
- compensating the first speaker by using the first target compensation signal, compensating the second speaker by using the second target compensation signal, and returning to a step of the "receiving a monitoring sound signal picked up by the monitoring microphone".

Optionally, a process of the "determining a current first target compensation signal and a current second target compensation signal from preset various compensation signals" is:

- randomly selecting a first target amplitude compensation value and a second target amplitude compensation value from the preset various amplitude compensation values;
- randomly selecting a first target phase compensation value and a second target phase compensation value from the preset various phase compensation values;
- determining the first target amplitude compensation value and the first target phase compensation value as the current first target compensation signal; and
- determining the second target amplitude compensation value and the second target phase compensation value as the current second target compensation signal.

Optionally, a process of the "determining a current first target compensation signal and a current second target compensation signal from preset various compensation signals" is:

- according to an amplitude compensation value and a phase compensation value of a previous first target compensation signal, determining a first target amplitude compensation value and a first target phase compensation value of a next order from the preset various amplitude compensation values and the various phase compensation values respectively;
- determining the first target amplitude compensation value and the first target phase compensation value of the next order as the current first target compensation signal;
- according to an amplitude compensation value and a phase compensation value of a previous second target compensation signal, determining a second target amplitude compensation value and a second target phase compensation value of a next order from the preset various amplitude compensation values and the various phase compensation values respectively; and
- determining the second target amplitude compensation value and the second target phase compensation value of the next order as the current second target compensation signal.

Optionally, further comprising a first calibration microphone provided at a sound hole of the first speaker, and a second calibration microphone provided at a sound hole of the second speaker:

- a process of the "compensating the first speaker by using the first target compensation signal, compensating the second speaker by using the second target compensation signal" is:
- compensating an amplitude and a phase of a current first transfer function of the first speaker respectively by using the first target amplitude compensation value and the first target phase compensation value of the first target compensation signal, so as to obtain an updated first transfer function;
- compensating an amplitude and a phase of a current second transfer function of the second speaker respectively by using the second target amplitude compensation value and the second target phase compensation value of the second target compensation signal, so as to obtain an updated second transfer function;

wherein, in a first round of compensation, the first transfer function corresponding to the first speaker is obtained by analyzing a first sound signal picked up by the first speaker; the second transfer function corresponding to the second speaker is obtained by analyzing a second sound signal picked up by the second speaker.

Optionally, a difference value of every two adjacent amplitude compensation values is a preset amplitude value, and a difference value of every two adjacent phase compensation values is a preset phase value.

Optionally, a process of the "judging whether the monitoring sound signal satisfies a preset requirement" is:

judging whether the monitoring sound signal is in a preset frequency bandwidth range, and if yes, satisfying the preset requirement: if not, not satisfying the preset requirement.

Optionally, the monitoring microphone is located in a mid-vertical plane where the first speaker and the second speaker are connected.

An embodiment of the present disclosure further provides a far-field muffling apparatus for a head-mounted device, the apparatus applied to the head-mounted device, the head-mounted device comprising a first speaker, a second speaker, and further comprising a monitoring microphone, the apparatus comprises:

a receiving module configured for receiving a monitoring sound signal picked up by the monitoring microphone during operations of the first speaker and the second speaker;

a judging module configured for judging whether the monitoring sound signal satisfies a preset requirement, and if yes, triggering an ending module: if not, triggering a determining module;

the ending module is configured for ending an operation;

the determining module is configured for determining a current first target compensation signal and a current second target compensation signal from preset various compensation signals;

a compensating module configured for compensating the first speaker by using the first target compensation signal, compensating the second speaker by using the second target compensation signal, and returning to a step of the "receiving a monitoring sound signal picked up by the monitoring microphone".

An embodiment of the present disclosure further provides a far-field muffling system for a head-mounted device, the system applied to the head-mounted device, the head-mounted device comprising a first speaker, a second speaker, and further comprising a monitoring microphone, the device comprising a processor and a memory, wherein:

the memory is configured for storing a computer program;

the processor is configured for implementing steps of the above far-field muffling method for a head-mounted device when executing the computer program.

An embodiment of the present disclosure further provides a head-mounted device comprising a first speaker, a second speaker, a monitoring microphone and the above far-field muffling system for a head-mounted device.

An embodiment of the present disclosure provides a far-field muffling method for a head-mounted device, apparatus and system, which is applied to the head-mounted device. The head-mounted device comprises a first speaker, a second speaker, and further comprises a monitoring microphone. The method comprises: receiving a monitoring sound signal picked up by the monitoring microphone during operations of the first speaker and the second speaker: judging whether the monitoring sound signal satisfies a preset requirement, and if yes, ending: if not, determining a current first target compensation signal and a current second target compensation signal from preset various compensation signals: compensating the first speaker by using the first target compensation signal, compensating the second speaker by using the second target compensation signal, and returning to a step of the "receiving a monitoring sound signal picked up by the monitoring microphone".

It can be seen that the head-mounted device of the present disclosure comprises the first speaker, the second speaker and the monitoring microphone. During operations of the first speaker and the second speaker, picking up the monitoring sound signal by the monitoring microphone, judging whether the monitoring sound signal satisfies a preset requirement, and if not, determining a current first target compensation signal and a current second target compensation signal from preset various compensation signals, then compensating the first speaker by using the first target compensation signal, compensating the second speaker by using the second target compensation signal, again picking up the monitoring sound signal by the monitoring microphone and conducting a new round of judgment, and performing compensation again when it is not satisfied, until the picked up monitoring sound signal satisfies the preset requirement. The present disclosure is beneficial in improving the far-field muffling effect during use, thereby enhancing the user's experience. In addition, the present disclosure further provides a head-mounted device, which has the same beneficial effects as mentioned above.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only a part of the drawings of the present disclosure. For those skilled in the art, other drawings can also be obtained according to the disclosed drawings without creative efforts.

DETAILED DESCRIPTION

Embodiments of the present disclosure provide a head-mounted device, and a far-field muffling method, apparatus and system, which is beneficial in improving the far-field muffling effect during use, thereby enhancing the user's experience.

The technical solutions in the embodiments of the present disclosure are described below in conjunction with the accompanying drawings in the embodiments of the present disclosure. Obviously, the described embodiments are only a few embodiments of the present disclosure, not all embodiments. Based on the embodiments in the present disclosure, all other embodiments obtained by a person skilled in the art without creative work shall fall within the scope of protection of the present disclosure.

Figure 1:
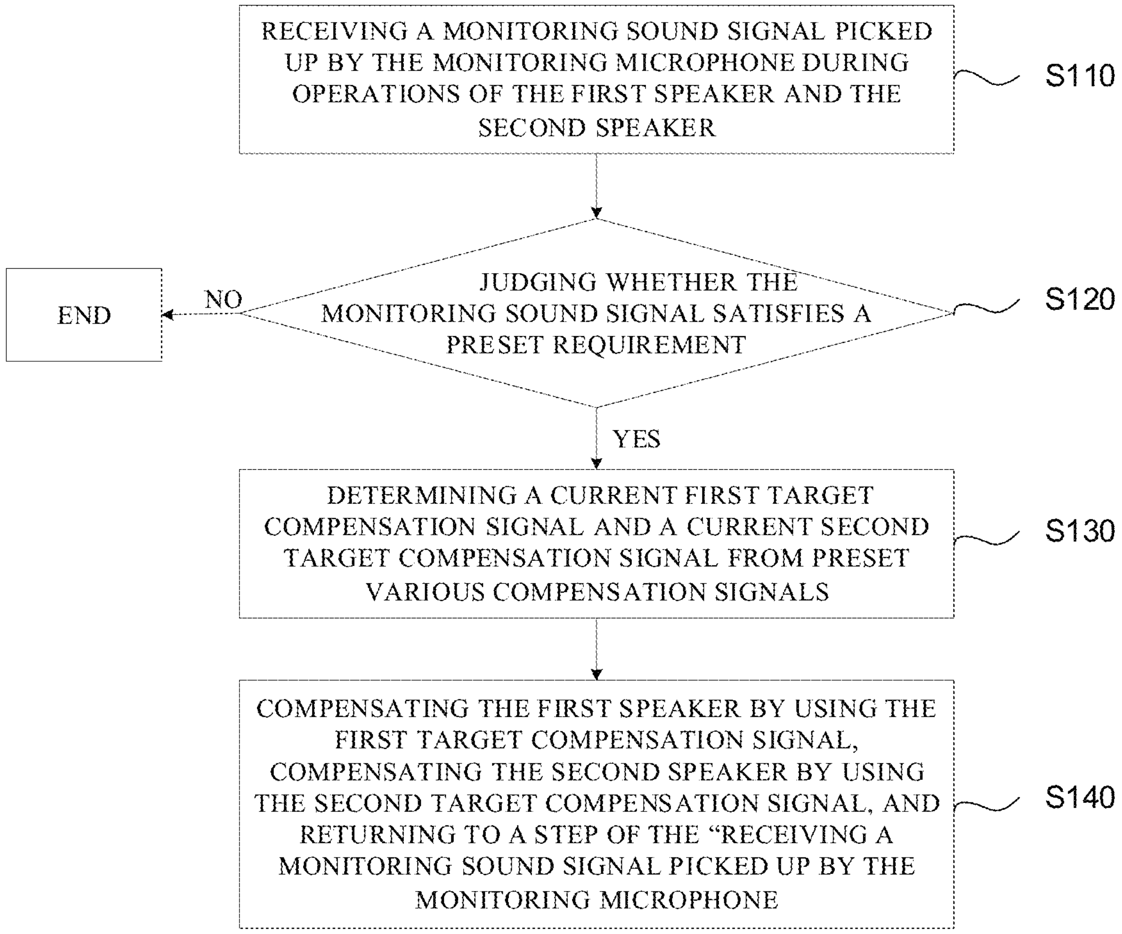
FIG. 1 shows a flowchart of a far-field muffling method for a head-mounted device provided by an embodiment of the present disclosure.

Please refer to FIG. 1, FIG. 1 shows a flowchart of a far-field muffling method for a head-mounted device provided by an embodiment of the present disclosure. The method is applied to the head-mounted device, and the head-mounted device comprises a first speaker, a second speaker, and further comprises a monitoring microphone. The method comprises:

S110: receiving a monitoring sound signal picked up by the monitoring microphone during operations of the first speaker and the second speaker:

It should be noted that during operations of the first speaker and the second speaker in the embodiment of the present disclosure, the monitoring microphone picks up the monitoring sound signal, which may reflect the far-field muffling effect of the first speaker and the second speaker.

S120: judging whether the monitoring sound signal satisfies a preset requirement, and if yes, ending: if not, then proceeding to S130:

Specifically, after receiving the monitoring sound signal, it is possible to judge whether the monitoring sound signal satisfies a preset requirement, wherein the preset requirement may be specifically a preset frequency bandwidth range. That is, judging whether the frequency of the monitoring sound signal is in the preset frequency bandwidth range, which may be 50 hz~10 Khz and may be specifically determined according to the actual situation, which is not specifically limited by the embodiments of the present disclosure. If the monitoring sound signal satisfies the preset requirement, the operation will be ended directly, and when the monitoring sound signal does not satisfy the preset requirement, the operation will proceed to the next step.

S130: determining a current first target compensation signal and a current second target compensation signal from preset various compensation signals:

Specifically, the embodiment of the present disclosure may pre-set a plurality of compensation signals, and when it is determined that the monitoring sound signal does not satisfy the preset requirement, the current first target compensation signal and the current second target compensation signal are determined from the preset various compensation signals.

S140: compensating the first speaker by using the first target compensation signal, compensating the second speaker by using the second target compensation signal, and returning to a step of the "receiving a monitoring sound signal picked up by the monitoring microphone".

Specifically, after the current first target compensation signal and the current second target compensation signal are obtained, the first speaker is compensated by using the first target compensation signal, and specifically, the amplitude and the phase corresponding to the first speaker are compensated: the second speaker is compensated by using the second target compensation signal, and specifically, the amplitude and the phase corresponding to the second speaker are compensated: after the compensation is completed, receiving the monitoring sound signal picked up by the monitoring microphone again, then judging a new monitoring sound signal to determine whether the monitoring sound signal of the signal satisfies the preset requirement, and if not, re-selecting a new first target compensation signal and a new second target compensation signal, then compensating the first speaker and the second speaker by respectively using the new first target compensation signal and the new second target compensation signal, until the picked up monitoring sound signal satisfies the preset requirement, so as to better perform far-field muffling and improves the user's experience.

Further, a process of the "determining a current first target compensation signal and a current second target compensation signal from preset various compensation signals" in the above S130 may specifically be:

randomly selecting a first target amplitude compensation value and a second target amplitude compensation value from the preset various amplitude compensation values;

randomly selecting a first target phase compensation value and a second target phase compensation value from the preset various phase compensation values;

determining the first target amplitude compensation value and the first target phase compensation value as the current first target compensation signal;

determining the second target amplitude compensation value and the second target phase compensation value as the current second target compensation signal.

It should be noted that the embodiment of the present disclosure may pre-set a plurality of amplitude compensation values and a plurality of various phase compensation values, and then when it is determined that the monitoring sound signal does not satisfy the preset requirement, it is possible to randomly select the first target amplitude compensation value and the second target amplitude compensation value from the various amplitude compensation values, and to randomly select the first target phase value and the second target phase value from the preset various phase compensation values, wherein the first target amplitude compensation value and the second target amplitude compensation value may be the same or different, and the first target phase value and the second target phase value may be the same or different. Then, the first target amplitude compensation value and the first target phase compensation value are taken as the first target compensation signal, and the second target amplitude compensation value and the second target phase compensation value are taken as the second target compensation signal: the random selection method used in the embodiments of the present disclosure is simple and easy to implement.

Further, a process of the "determining a current first target compensation signal and a current second target compensation signal from preset various compensation signals" in the above S130 may specifically be:

according to an amplitude compensation value and a phase compensation value of a previous first target compensation signal, determining a first target amplitude compensation value and a first target phase compensation value of a next order from the preset various amplitude compensation values and the various phase compensation values respectively;

determining the first target amplitude compensation value and the first target phase compensation value of the next order as the current first target compensation signal;

according to an amplitude compensation value and a phase compensation value of a previous second target compensation signal, determining a second target amplitude compensation value and a second target phase compensation value of a next order from the preset various amplitude compensation values and the various phase compensation values respectively; and determining the second target amplitude compensation value and the second target phase compensation value of the next order as the current second target compensation signal.

It should be noted that in the embodiment of the present disclosure, each compensation may be carried out according to the order, that is, the amplitude compensation value of the next order and the phase compensation value of the next order are used as the determined target compensation signal during each compensation, which may better compensate the speakers, so that the first speaker and the second speaker after compensation may better realize far-field muffling when working.

Specifically, the first speaker may determine, according to amplitude and phase compensation values in the first target compensation signal determined during the previous compensation, the first target amplitude compensation value of the next order from the preset various amplitude compensation values and the first target phase compensation value of the next order from the preset various phase compensation values, and then take the first target amplitude compensation value and the first target phase compensation value selected this time as the current determined first target compensation signal, so as to use the first target compensation signal to compensate the amplitude and phase of the first speaker, respectively.

Similarly, the second speaker may determine, according to amplitude and phase compensation values in the second target compensation signal determined during the previous compensation, the second target amplitude compensation value of the next order from the preset various amplitude compensation values and the second target phase compensation value of the next order from the preset various phase compensation values, and then take the second target amplitude compensation value and the second target phase compensation value selected this time as the current determined second target compensation signal, so as to use the second target compensation signal to compensate the amplitude and phase of the second speaker, respectively.

Specifically, in the embodiment of the present disclosure, a difference value of every two adjacent amplitude compensation values is a preset amplitude value, and a phase difference value of every two adjacent phase compensation values is a preset phase value.

It should be noted that in a practical application, an amplitude range, for example, (−10~10) dB, and a phase range, for example, (−60° ~60°, may be set in advance: then a preset amplitude value, e.g., 0.5 dB, i.e., every 0.5 dB is an order, and a preset phase value, e.g., 5°, i.e., every 5° is an order, are determined, such that a plurality of amplitude compensation values may be obtained, for example, S1 (−10 dB), S2 (−9.5 dB), S3 (−9 dB) . . . . Sn respectively: a plurality of phase compensation values may be obtained, for example, P1 (−60°), P2 (−55°), P3 (−50°) . . . Pn respectively, so as to obtain a plurality of compensation signals (Sn, Pn, wherein n is the total number of the compensation signals): the first target compensation signal and the second target compensation signal may be selected from the various compensation signals by using a random selection method, or the first target compensation signal and the second target compensation signal may also be determined by using the above order-by-order selection method.

Figure 2:
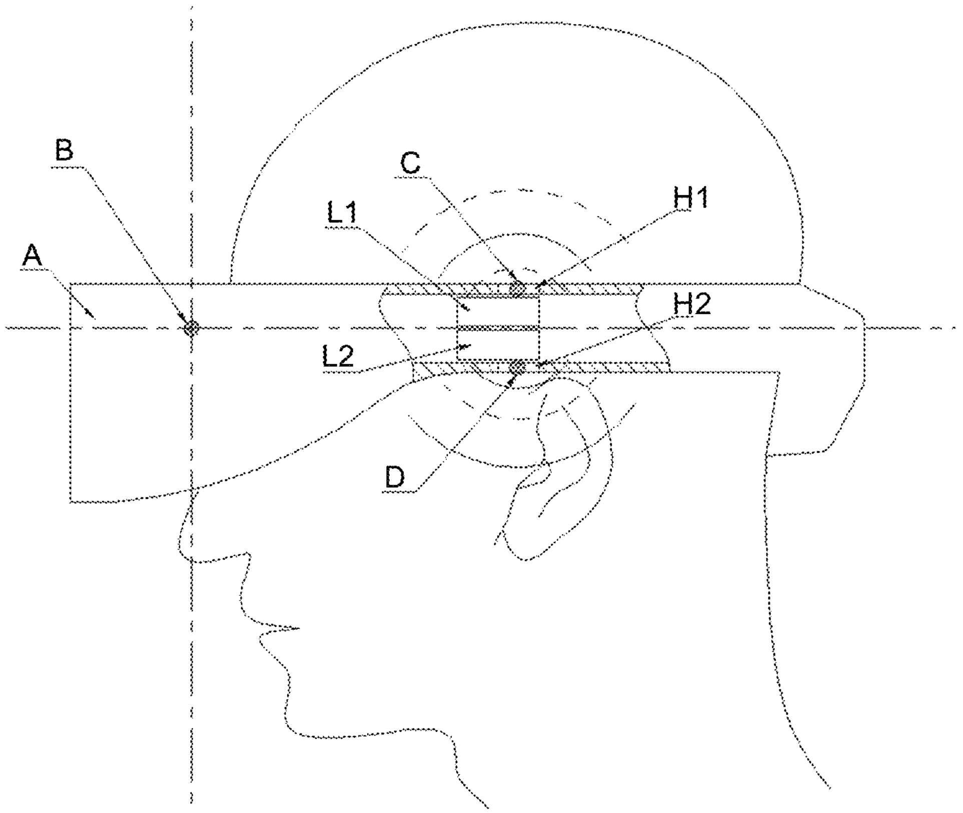
FIG. 2 shows a structural schematic diagram of a head-mounted device provided by an embodiment of the present disclosure.
Figure 3:
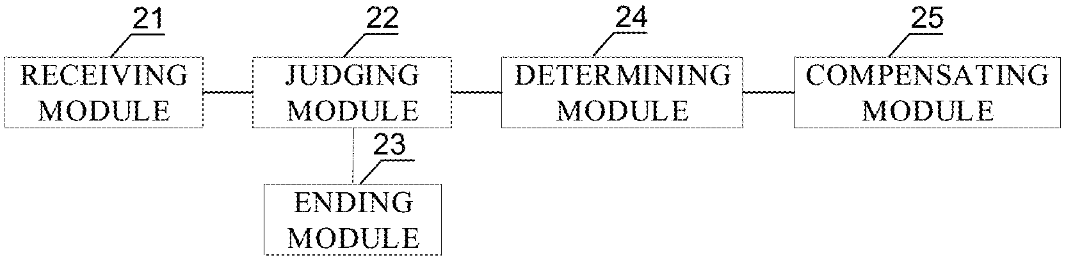
FIG. 3 shows a structural schematic diagram of a far-field muffling apparatus for a head-mounted device provided by an embodiment of the present disclosure.

Further, as shown in FIG. 2, the head-mounted device in the embodiment of the present disclosure further comprises a first calibration microphone provided at a sound hole of the first speaker, and a second calibration microphone provided at a sound hole of the second speaker; wherein, in FIG. 2, A represents the head-mounted device, B represents the monitoring microphone, C represents the first calibration microphone. D represents the second calibration microphone, L1 represents the first speaker, L2 represents the second speaker, H1 represents the sound hole of the first speaker, and H2 represents the sound hole of the second speaker. Wherein, in order to improve the monitoring accuracy, in the embodiment of the present disclosure, the monitoring microphone is located in a mid-vertical plane where the first speaker and the second speaker are connected.

Specifically, after the head-mounted device is activated, that is, when the first speaker and the second speaker begin to operate after the first round of compensation, the first microphone signal at the sound hole of the first speaker may be picked up by the first calibration microphone, and the second microphone signal at the sound hole of the second speaker may be picked up by the second calibration microphone: then a first transfer function corresponding to the first speaker in the first round of compensation may be determined based on the first microphone signal, and a second transfer function corresponding to the second speaker may be obtained based on the second microphone signal.

Then, a process of the "compensating the first speaker by using the target compensation signal, compensating the second speaker by using the second target compensation signal" in the above corresponding S140 may specifically be:

- compensating an amplitude and a phase of a current first transfer function of the first speaker respectively by using the first target compensation value, so as to obtain an updated first transfer function;
- compensating an amplitude and a phase of a current second transfer function of the second speaker respectively by using the second target compensation value, so as to obtain an updated second transfer function:

Specifically, in the embodiment of the present disclosure, after the first target compensation signal and the second target compensation signal are determined, compensating the amplitude and the phase of a current first transfer function of the first speaker respectively by using the first target compensation signal, and obtaining the updated first transfer function;

For example, taking the first transfer function of the first speaker as an example:

At present, the first transfer function is E1, the first target compensation signal is (Sn, Pn) for a certain channel that does not satisfy the preset requirement, and then the updated first transfer function after compensation is E+b (Sn, Pn). If there are multiple frequency points that do not satisfy the preset requirement, then the corresponding first target compensation signal can only be determined randomly for each frequency point, and then compensation is performed, for example, the first transfer function after compensation is: E+b1 (Sn, Pn)+b2 (Sn, Pn) . . . +bN (Sn, Pn), wherein the first target compensation signal corresponding to the Nth frequency point not requiring the preset requirement is randomly selected from the various compensation signals, and the above is only an example and is not limited to this case. In addition, for the compensation of the second transmission signal of the second speaker, please refer to the above description, which will not be repeated herein.

It can be seen that the head-mounted device of the present disclosure comprises the first speaker, the second speaker and the monitoring microphone. During operations of the first speaker and the second speaker, picking up the monitoring sound signal by the monitoring microphone, judging whether the monitoring sound signal satisfies a preset requirement, and if not, determining the first target compensation signal and the second target compensation signal from preset various compensation signals, then compensating the first speaker by using the first target compensation signal, compensating the second speaker by using the second target compensation signal, again picking up the monitoring sound signal by the monitoring microphone and conducting a new round of judgment, and performing compensation again when it is not satisfied, until the picked up monitoring sound signal satisfies the preset requirement. The present disclosure is beneficial in improving the far-field muffling effect during use, thereby enhancing the user's experience.

On the basis of the above embodiments, the embodiment of the present disclosure further provides a far-field muffling apparatus for a head-mounted device, the apparatus applied to the head-mounted device, the head-mounted device comprising a first speaker, a second speaker, and further comprising a monitoring microphone, the apparatus comprises:

a receiving module 21 configured for receiving a monitoring sound signal picked up by the monitoring microphone during operations of the first speaker and the second speaker;

a judging module 22 configured for judging whether the monitoring sound signal satisfies a preset requirement, and if yes, triggering an ending module 23: if not, triggering a determining module 24;

the ending module 23 is configured for ending an operation;

the determining module 24 is configured for determining a current first target compensation signal and a current second target compensation signal from preset various compensation signals;

a compensating module 25 configured for compensating the first speaker by using the first target compensation signal, compensating the second speaker by using the second target compensation signal, and returning to a step of the "receiving a monitoring sound signal picked up by the monitoring microphone".

Optionally, further comprising a first calibration microphone provided at a sound hole of the first speaker, and a second calibration microphone provided at a sound hole of the second speaker: the compensation signal comprises the amplitude compensation value and the phase compensation value:

Then, the determining module 24 is specifically configured for randomly selecting the first target compensation signal and the second target compensation signal from various compensation signals.

It should be noted that the far-field muffling apparatus for a head-mounted device provided by the embodiment of the present disclosure has the same advantageous effect as that of the far-field muffling method for a head-mounted device involved in the above embodiment, and for the specific introduction of the far-field muffling method for a head-mounted device involved in the embodiment of the present disclosure, please refer to the above embodiment, which will not be repeated herein.

On the basis of the above embodiments, the embodiment of the present disclosure further provides a far-field muffling system for a head-mounted device, the system applied to the head-mounted device, the head-mounted device comprising a first speaker, a second speaker, and further comprising a monitoring microphone, the device comprising a processor and a memory, wherein:

the memory is configured for storing a computer program;

the processor is configured for implementing steps of the above far-field muffling method for a head-mounted device when executing the computer program.

For example, the processor in the embodiment of the present disclosure may specifically be configured for implementing: receiving a monitoring sound signal picked up by the monitoring microphone during operations of the first speaker and the second speaker; judging whether the monitoring sound signal satisfies a preset requirement, and if yes, ending; if not, determining the first target compensation signal and the second target compensation signal from preset various compensation signals: compensating the first speaker by using the target compensation signal, compensating the second speaker by using the second target compensation signal, and returning to a step of the "receiving a monitoring sound signal picked up by the monitoring microphone".

On the basis of the above embodiments, the embodiment of the present disclosure further provides a head-mounted device comprising a first speaker, a second speaker, a monitoring microphone and the above far-field muffling system for a head-mounted device.

Wherein, the head-mounted device in the embodiment of the present disclosure further comprises a first microphone provided at a sound hole of the first speaker, and a second microphone provided at a sound hole of the second speaker. Please refer to FIG. 2 for details.

Specifically, the head-mounted device provided in the embodiment of the present disclosure has the same advantageous effect as above.

The embodiments in the present specification are described in parallel or in progression, and each embodiment focuses on its differences from other embodiments, and the same or similar parts of each embodiment can be referred to each other. For the device disclosed in the embodiment, since it corresponds to the method disclosed in the embodiment, the description is relatively simple, and the relevant parts can be referred to the description of the method part.

It is also understood by ordinary skilled in the art that the units and algorithmic steps of the various examples described with reference to the embodiments of the present disclosure can be implemented by electronic hardware, computer software, or a combination of both. To clearly illustrate the interchangeability of hardware and software, the components and steps of the examples have been generally described in terms of their functions in the above description. Whether these functions are performed in hardware or software depends on the specific application and design constraints of the technical solution. Professional technicians can use different methods to implement the described functions for each specific application, but such implementation should not be considered as exceeding the scope of this disclosure.

The steps of the methods or algorithms described in the embodiments disclosed in this document can be implemented directly by hardware, software modules executed by a processor, or a combination of both. The software modules can be placed in random access memory (RAM), memory, read-only memory (ROM), electrically programmable ROM, electrically erasable programmable ROM, registers, hard disks, removable disks, CD-ROMs, or any other form of storage medium known in the technical field.

It should also be noted that in this article, relational terms such as first and second, etc., are used solely to distinguish one entity or operation from another, and do not necessarily require or imply any such actual relationship or sequence between those entities or operations. Further, the term "comprise", "include" or any other variation thereof is intended to cover non-exclusive comprising so that a process, method, article or apparatus that comprises a series of elements includes not only those elements, but also other elements that are not expressly listed, or also comprises elements inherent in such process, method, article or apparatus. Without further limitation, the elements defined by the phrase "comprising a . . . " do not preclude the existence of other identical elements in the process, method, article or apparatus that includes the elements.

The invention claimed is:

1. A far-field muffling method for a head-mounted device, wherein the head-mounted device comprises a first speaker, a second speaker, and a monitoring microphone, and the first speaker, and the first speaker, the second speaker, and the monitoring microphone are arranged at a single ear of a user when the head-mounted device is worn by the user, the method comprising:

receiving a monitoring sound signal by the monitoring microphone during operations of the first speaker and the second speaker, judging whether the monitoring sound signal satisfies a preset requirement;

if the preset requirement is satisfied, ending the method;

if the preset requirement is not satisfied, determining a current first target compensation signal and a current second target compensation signal from preset various compensation signals, and compensating the first speaker by using the first target compensation signal, compensating the second speaker by using the second target compensation signal, and returning to the receiving a monitoring sound signal picked up by the monitoring microphone.

2. The far-field muffling method according to claim 1 for a head-mounted device, wherein the determining a current first target compensation signal and a current second target compensation signal from preset various compensation signals comprises:

randomly selecting a first target amplitude compensation value and randomly selecting a second target amplitude compensation value from the preset various compensation values;

randomly selecting a first target phase compensation value and randomly selecting a second target phase compensation value from the preset various compensation values;

determining the first target amplitude compensation value and the first target phase compensation value as the current first target compensation signal; and determining the second target amplitude compensation value and the second target phase compensation value as the current second target compensation signal.

3. The far-field muffling method according to claim 2 for a head-mounted device, wherein the head-mounted device further comprises a first calibration microphone provided at a sound hole of the first speaker, and a second calibration microphone provided at a sound hole of the second speaker;

wherein the compensating the first speaker by using the first target compensation signal, compensating the second speaker by using the second target compensation signal further comprises:

compensating an amplitude and a phase of a current first transfer function of the first speaker respectively by using the first target amplitude compensation value and the first target phase compensation value of the first target compensation signal, so as to obtain an updated first transfer function; and compensating an amplitude and a phase of a current second transfer function of the second speaker respectively by using the second target amplitude compensation value and the second target phase compensation value of the second target compensation signal, so as to obtain an updated second transfer function;

wherein, in a first round of compensation, the first transfer function corresponding to the first speaker is obtained by analyzing a first sound signal picked up by the first speaker; and the second transfer function corresponding to the second speaker is obtained by analyzing a second sound signal picked up by the second speaker.

4. The far-field muffling method according to claim 3 for a head-mounted device, wherein a difference value of every two adjacent amplitude compensation values is a preset amplitude value, and a difference value of every two adjacent phase compensation values is a preset phase value.

5. The far-field muffling method according to claim 1 for a head-mounted device, wherein a the determining a current first target compensation signal and a current second target compensation signal from preset various compensation signals comprises:

determining a first target amplitude compensation value and a first target phase compensation value of a next order from the preset various amplitude compensation values and the various phase compensation values respectively, wherein the determining a first target amplitude compensation value and a first target phase compensation value of a next order is according to an amplitude compensation value and a phase compensation value of a previous first target compensation signal;

determining the current first target compensation signal using the first target amplitude compensation value and the first target phase compensation value of the next order;

determining a second target amplitude compensation value and a second target phase compensation value of a next order from the preset various amplitude compensation values and the various phase compensation values respectively, wherein the determining a second target amplitude compensation value and a second target phase compensation value of a next order is according to an amplitude compensation value and a phase compensation value of a previous second target compensation signal; and determining the current second target compensation signal using the second target amplitude compensation value and the second target phase compensation value of the next order.

6. The far-field muffling method according to claim 1 for a head-mounted device, wherein the judging whether the monitoring sound signal satisfies a preset requirement comprises:

judging whether the monitoring sound signal is in a preset frequency bandwidth range, and if yes, satisfying the preset requirement; and if not, not satisfying the preset requirement.

7. The far-field muffling method according to claim 1 for a head-mounted device, wherein the monitoring microphone is located in a mid-vertical plane where the first speaker and the second speaker are connected.

8. A far-field muffling system for a head-mounted device, wherein the head-mounted device comprises a first speaker, a second speaker, a monitoring microphone, a processor and a memory, and the first speaker, the second speaker, and the monitoring microphone are arranged at a single ear of a user when the head-mounted device is worn by the user, wherein:

the memory is configured to store a computer program;

the processor is configured to implement the far-field muffling method according to claim 1 for a head-mounted device when executing the computer program.

9. A head-mounted device comprising a first speaker, a second speaker, a monitoring microphone and the far-field muffling system according to claim 8 for a head-mounted device, and the first speaker, the second speaker, and the monitoring microphone being arranged at a single ear of a user when the head-mounted device is worn by the user.

10. A far-field muffling apparatus for a head-mounted device, wherein the head-mounted device comprises a first speaker, a second speaker, and a monitoring microphone, and the first speaker, the second speaker, and the monitoring microphone are arranged at a single ear of a user when the head-mounted device is worn by the user, the apparatus comprising:

a receiving module configured to receive a monitoring sound signal picked up by the monitoring microphone during operations of the first speaker and the second speaker;

a judging module configured to judge whether the monitoring sound signal satisfies a preset requirement, and if the preset requirement is satisfied, to trigger an ending module; if the preset requirement is not satisfied, to trigger a determining module;

the ending module configured for ending an operation;

the determining module configured to determine a current first target compensation signal and a current second target compensation signal from preset various compensation signals;

a compensating module configured to compensate the first speaker by using the first target compensation signal, to compensate the second speaker by using the second target compensation signal, and to trigger a return to the receiving module.

* * * * *